UNITED STATES PATENT OFFICE 2,549,111

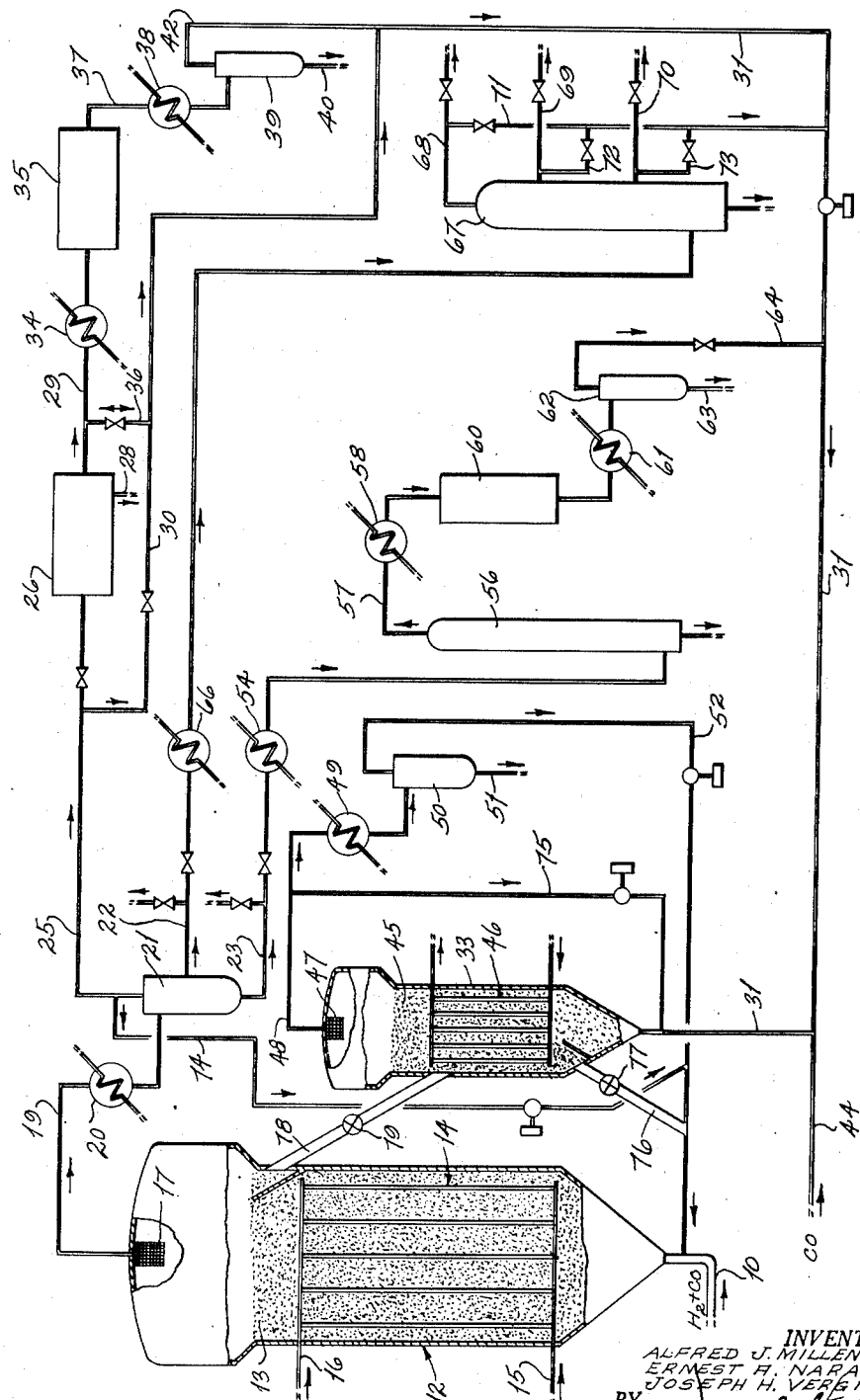

COMBINATION SYNTHESIS OF HYDROCARBONS AND ORGANIC CARBONYL COMPOUNDS

Alfred J. Millendorf, Beacon, Ernest A. Naragon, Glenham, and Joseph H. Vergilio, Beacon, N. Y., assignors to The Texas Company, New York, N. Y., a corporation of Delaware Application May 28, 1948, Serial No. 29,718

4 Claims. (Cl. 260—449.6)

The present invention relates to catalytic synthesis of hydrocarbons, oxygenated hydrocarbons and the like, and is more specifically concerned with the integrated production of predetermined aldehydes, ketones and the like, concurrently with the manufacture of desired hydrocarbon fractions.

In particular, the invention contemplates the continuous passage of a synthesis gas comprising hydrogen and carbon monoxide in contact with a hydrocarbon synthesis catalyst, preferably of the iron-containing type, at an elevated temperature and advantageously under a superatmospheric pressure at which the synthesis gas is directly converted into predetermined hydrocarbon fractions of predominantly olefinic character. Thereafter, the reaction product is withdrawn from contact with the catalyst and the normally liquid fractions are separated.

If desired, all, or any predetermined portion of the normally gaseous olefins is separated from the normally gaseous fraction. The residual normally gaseous fraction normally contains a minor amount of carbon monoxide, together with larger amounts of hydrogen, substantial proportions of carbon dioxide, and also methane and other light gaseous hydrocarbons. This mixture, with a preselected fraction of olefins, is passed through a second reaction zone in contact with a catalyst comprising iron and/or cobalt, at a substantially increased pressure and usually at a somewhat lower temperature at which the olefin fraction reacts with hydrogen and carbon monoxide to form predetermined corresponding ketones, aldehydes or mixtures thereof.

The charge gases to the second reaction zone are advantageously supplemented with carbon monoxide in a proportion sufficient to facilitate the desired conversion of the olefin into ketones or aldehydes. By controlling the proportion of reactants to the conversion zone and the conditions of reaction, the product may be selectively channeled into the production of specific carbonyl compounds.

Since the products of the olefin conversion consist, apart from the desired products, of essentially unchanged, unreacted portions of the original feed materials, it is possible to recycle the normally gaseous products thereof back to the inlet of the first or hydrocarbon conversion zone. As a result, maximum conversion of the reactants fed to the conversion zone becomes relatively less critical, and the process may be operated continually with due consideration for maintenance of desired catalyst condition and catalyst life, minimization of free carbon formation and high yields of desired product.

Heretofore, it has usually been necessary to exert every effort to effect maximum conversion of the reactants in the olefin conversion or carbonylation zone by exhausting them to a low level of concentration in the product gases from the olefin conversion step in order to realize an economical utilization of the feed materials. It has been found that the resulting conditions are unfavorable to maximum catalyst life and condition. In accordance with the present invention, however, the inlet and outlet concentrations of reactants may be maintained at levels more appropriate for long periods of continuous operation because the resulting unreacted gases are not wasted but on the contrary, form a more or less ideal supplement for the normal fresh feed for the hydrocarbon synthesis zone and thus continuously contribute to both the hydrocarbon yield and the supply of additional fresh reactant feed to the olefin conversion zone.

In addition, this feature of operation is of particular advantage in that it has been discovered that the supposedly unreactive gases from the hydrocarbon synthesis step, e. g., methane, ethane, carbon dioxide, nitrogen and the like, exert a surprising improvement as regards carbonylation of the olefin with the hydrogen and carbon monoxide, increasing the yield and extending catalyst life and activity.

As intimated above, the invention has particular application to the selective conversion of normally gaseous olefins into corresponding ketones and/or aldehydes which are readily convertible to corresponding alcohols and esters. For example, using a cobalt catalyst at a temperature of 150° F. and a pressure of 300 p. s. i., and supplying as a feed, a carbon monoxide-supplemented gaseous effluent from liquid hydrocarbon synthesis by an iron catalyst from which all olefins except ethylene have been removed, it is possible to produce selectively a liquid product containing upwardly of 80 per cent diethyl ketone, with a conversion of up to 50 per cent, on the basis of the theoretical combining mixture charged.

Advantageously, such process is carried out with proper control of the relative proportions of hydrogen, carbon monoxide and ethylene, and under proper reaction conditions, in accordance with the teachings of copending application, Serial No. 773,938, filed September 13, 1947, now abandoned, to which reference is made in respect to details. Conversely, by variation of the conditions indicated therein, the production of propionaldehyde may be favored.

Similarly, by selective inclusion of the propylene or butylene product fractions in the olefin conversion feed, a carbonylation product comprising predominantly the complementary ketones or aldehydes can be realized. Likewise, predetermined mixtures of any of the said olefins will selectively yield desired complex ketones, e. g., ethyl propyl ketone, ethyl-butyl ketone and the like.

Instead of being limited to carbonylation of normally gaseous olefines, the higher olefines, such as, for example, the $C_5$, $C_6$ or $C_7$ olefin cuts may be reintroduced or recombined with the carbonylation feed. Alternatively, the lower gaseous olefins may be retained for production of desired combination ketones, as above. Preferably, however, the invention contemplates the selective carbonylation of the normally gaseous fractions, such as the ethylene mentioned above, propylene or butylene fractions, either individually or in combination.

The invention additionally involves controlling the hydrocarbon synthesis reaction so as to maintain optimum supply of feed to the olefin conversion zone. Thus, as is known, the relative proportion of hydrogen and carbon dioxide in the normally gaseous products of the hydrocarbon synthesis reaction, is subject to wide variation, in accordance with such things as the rate at which the gaseous product of this zone is recycled thereto, the operating temperature therein, and the extent of conversion effected. In general, increase in the value of any of the foregoing variables favors decrease in the amount of hydrogen and carbon dioxide in the synthesis product gas. This is particularly true where iron-containing catalysts are used in hydrocarbon synthesis, and for this reason the invention is particularly applicable to synthesis operations, employing such catalysts. Similarly, production of ethylene or kindred light hydrocarbon gases is variable within relatively wide limits by one skilled in the art, in accordance with reaction temperatures and the like. For example, increase in temperature results in increase in the gaseous olefin product. In all, therefore, the composition of the second step feed is continuously controllable.

While, as indicated above, the carbon monoxide requirement for olefin carbonylation is usually met by supplemental addition, the invention provides, where desired, for adjustment of the composition of the effluent gases of hydrocarbon synthesis so as to obviate or limit the requirement for additional carbon monoxide. To this end, the effluent products of hydrocarbon synthesis, after condensation and separation of the contained water vapor and liquid hydrocarbon fractions is subjected to so-called water-gas shifting at elevated temperature and pressure at which hydrogen and carbon dioxide contained therein are converted into water vapor and carbon monoxide in accordance with the following equation:

$$H_2 + CO_2 = CO + H_2O$$

The gaseous products of hydrocarbon synthesis, particularly in the case where iron catalyst is employed, while usually low in carbon monoxide, as previously indicated, usually contain relatively substantial proportions of unreacted hydrogen and carbon dioxide. The water-gas shift reaction occurs readily at temperatures in the range of from about 600 to 1500° F., for example, preferably in the absence of more than a minimum vapor pressure of steam, and in the presence of an iron oxide or nickel oxide catalyst. The ultimate composition of the shift gas depends upon the temperature of contact, increase in temperature within the foregoing range favoring the consumption of hydrogen and carbon dioxide in the formation of carbon monoxide. Accordingly, by selection of the proper temperature, the resulting gas mixture may be adjusted to any predetermined equilibrium composition wherein the reactants, hydrogen, carbon monoxide and ethylene, are in desired proportion.

The resulting gas is advisably subjected to condensation and separation for the removal of water vapor and the products supplied directly to the olefin conversion zone.

In order to more specifically describe the present invention, reference is had to the attached drawing wherein one preferred embodiment of the invention is outlined more or less diagrammatically. Therein the reference numeral 10 indicates a conduit receiving a fresh feed synthesis gas comprising essentially hydrogen and carbon monoxide in about a 2:1 molar ratio.

The gas is introduced upwardly into the interior of reactor 12, containing a dense phase fluid mass of catalyst particles 13 which immerses an indirect tubular exchanger, indicated more or less symbolically by the reference numeral 14, carrying a stream of a coolant such as Dowtherm, water or the like, introduced through inlet 15 and withdrawn at 16. Numeral 17 indicates a refractory filter or any other suitable form of separator, such as a cyclone, electrostatic or electromagnetic separating means, through which the effluent, gasiform products of reaction pass to outlet pipe 19. In condenser 20 and separator 21, the liquid fractions are segregated, the oil layer being removed for further treatment and/or use as at 22, and the water layer being removed at 23.

The reaction zone comprising the catalyst phase 13 is maintained at a temperature within the range of from about 400 to 700° F.; in the case of iron catalyst, between 550 and 700° F., and usually between 600–650° F. Superatmospheric pressures from 150 to 400 p. s. i. are advisable where the catalyst contains iron.

Under preferred operation, the major desired product is the liquid hydrocarbon fraction delivered through pipe 22, predominantly composed of hydrocarbons in the motor gasoline boiling range. The aqueous layer, recovered through pipe 23, predominantly by-product water, inherently contains small but substantial proportions of oxygenated hydrocarbons, primarily alcohols and most frequently comprising ethyl alcohol.

The residual, normally gaseous fraction from the hydrocarbon synthesis zone is withdrawn overhead from the separator as at 25 and may be passed to a fractionation or absorption system 26, where the stream is adjusted as regards olefin content. In view of the number of forms which this separating system may assume, the unit is advisedly disclosed in diagrammatic form.

In accordance with one embodiment of the gas separation system 26, there is a selective removal of the entire olefin content by fractionation or absorption. Alternatively, selective separation of propylene and butylene may be effected, the ethylene fraction being retained. The separated olefins in any case are discharged via outlet pipe 28 and the residual gas is passed into pipe 29.

Valved branch pipe 30 serves to by-pass all, or any desired portion of the effluent, normally gaseous product of the hydrocarbon synthesis reaction, and discharges through recycle line 31 into the lower portion of an olefin conversion reactor 33, as will be hereinafter mentioned in greater detail.

As intimated above, provision is made for adjusting the relative proportions of hydrogen, carbon dioxide and carbon monoxide content of the gaseous stream to the range appropriate for olefin carbonylation. To this end, the product stream in pipe 29, including any desired portion of the stream in pipe 30, may be passed through heat exchanger 34 into shift reactor 35, containing a mass of water-gas shift catalyst at a temperature of from about 600 to 1200° F.

Branch pipe 36 extending between pipes 29 and 30 permits either the treatment of the unaltered, normally gaseous stream of pipe 30, or by-passing of the shift reactor by any desired portion of respective streams. Accordingly, wide control is afforded of the final gas composition.

Equilibrium is reached in the reactor 35 in a brief period, e. g., 1–10 seconds, and the product, withdrawn through pipe 37, passes through condenser 38 into separator 39, from which water is continuously withdrawn as at 40. The overhead gases with the relative proportion of hydrogen, carbon monoxide and olefin now appropriately adjusted, pass overhead through recycle line 42, which joins with line 31 as indicated.

The aforementioned olefin carbonylation reaction zone 33, referred to above, is accordingly continuously supplied with a gaseous stream containing substantial proportions of hydrogen and carbon monoxide together with a predetermined olefin fraction. Supplemental addition of carbon monoxide, if necessary, is effected via branch pipe 44, supplied from any suitable source, not shown.

The reactor 33, as indicated, may take the same form as the previously described reactor 12 containing a carbonylation catalyst, as for example, a metal of the VIII group of the periodic system, such as iron, cobalt or nickel, as a preferably dense fluid phase 45. A tubular system 46, as before, provides temperature control in the range of, for example, 100 to 350° F., and pressures are above 100 p. s. i., preferably in the range of about 300 p. s. i. upwardly to 1000 p. s. i. or more.

The reaction between the olefin (e. g., ethylene), carbon monoxide and hydrogen to produce predominantly diethyl ketone, is effected at pressures preferably between 250 and 700 p. s. i. and at a temperature below 300° F., advantageously in the range of from about 125 to 200° F., in the presence of a catalyst containing a metal of the iron group. Highly selective yields of diethyl ketone may be realized by maintaining the relationship of the reactants such that the molar ratio of ethylene to carbon monoxide is at least 1.5:1 and the molar ratio of ethylene to hydrogen is at least 0.67:1.

Under these exemplary conditions, the gaseous effluent withdrawn through separator 47 to outlet pipe 48 contains relatively large proportions of the desired carbonyl compound, which are condensed at 49 and recovered from separator 50 by outlet pipe 51. The gaseous residue comprising unreacted hydrogen, carbon monoxide and the like, is recycled through pipe 52 to the first stage or hydrocarbon synthesis reactor, as indicated.

Referring, now, to the aqueous condensate recovered in separator 21, the stream thereof in pipe 23 may be raised in temperature in a heat exchanger 54 and subjected to distillation as at 56 for the recovery of a preferably concentrated fraction of ethyl or any desired higher alcohol. The alcohol distillate is withdrawn through pipe 57, continuously heated in exchanger 58, and passed, at a temperature of 360° F., for example, through a dehydration zone 60. The catalyst in zone 60 may comprise any typical alcohol dehydration catalyst, as for example, activated alumina, bauxite, aluminum phosphate, or coke impregnated with glacial phosphoric acid. Contact temperature may vary widely between about 100 and 400° C., depending upon the alcohol fraction treated.

The product of dehydration is essentially an olefin fraction, corresponding to the alcohol treated, together with a corresponding molar content of water vapor. The water vapor is removed by passage through condenser 61 and separator 62, and is continuously withdrawn as a liquid stream from pipe 63. As indicated, the overhead olefin, as for example, ethylene, passes through pipe 64 into aforementioned recycle line 31. Hence the stream made available provides for additionally supplementing or adjusting olefin feed to the conversion zone at the expense of undesired alcohols produced in the process.

Similar provision is made for selectively reintroducing any desired higher boiling fraction of olefin contained in the liquid hydrocarbon product of synthesis. To this end, the liquid hydrocarbon stream in pipe 22 is heated to an elevated temperature in exchanger 66 and continuously supplied to a fractionation system indicated symbolically as 67, from which desired fractions are recovered continuously from tap-off lines 68, 69 and 70, and either withdrawn from the system or selectively returned to the recycle line 31 by way of valved branch pipes 71, 72 and 73.

In addition to continuous recycle of effluent gases from olefin carbonylation step to the hydrocarbon synthesis reaction zone, it is usually advantageous to carry out simultaneously the continuous recycle of a portion of the normally gaseous products through the respective reaction zones. Accordingly, a branch pipe 74 continuously returns a portion of the gaseous fraction from the hydrocarbon synthesis zone to the recycle line 52 for recycle to that zone. Similarly, a branch pipe 75 connects the outlet pipe 48 of the olefin carbonylation zone 33 to the inlet pipe 31 thereof.

Instead of providing the reactors 12 and 33 with independent catalyst masses, where a common catalyst is employed in the hydrocarbon synthesis and olefin carbonylation zones, it has been found advantageous, from the standpoint of improving catalyst life and activity, to effect a continuous cyclic circulation of the catalyst between the two zones. This may be effected in a fluid system by continuously withdrawing a portion of the catalyst from reactor 33 by way of standpipe 76 controlled by mechanical feeder 77, and continuously discharging the withdrawn particles of catalyst into recycle line 52, where they are picked up and transported into the reactor 12. Simultaneously, a corresponding portion of catalyst is withdrawn from standpipe 78 by mechanical feeder 79 and returned directly to the reactor 33. Numerous other arrangements affording continuous catalyst circulation between the two stages will be apparent in light of the foregoing.

In accordance with one example, a synthesis gas comprising essentially hydrogen and carbon monoxide in approximately 2:1 molar ratio is continuously passed upwardly through a mass of catalyst comprising reduced iron oxide particles of about 200-400 mesh, containing about 1 per cent alumina and about 1.5 per cent potassium oxide ($K_2O$), at a temperature of about 650° F. and a pressure of about 250 p. s. i. The effluent products of reaction are withdrawn from contact with the catalyst, and condensed at about 70-80° F. The water layer is discarded and the liquid hydrocarbons recovered for use as a motor gasoline.

The residual normally gaseous fraction is treated for the removal and separation of contained propylene, butylene and the entire residue mixed with a supplement of carbon monoxide such that the resulting mixture contains ethylene, carbon monoxide and hydrogen in a molar ratio of 2.4/1.0/1.1. These are introduced continuously at a space velocity of about 93 volumes of reactant mixture per volume of catalyst, into a carbonylation zone containing a supported cobalt catalyst comprising 32 per cent cobalt, 64 per cent uncalcined diatomaceous earth, 3 per cent magnesia and 1 per cent thoria. The catalyst, previously reduced at 660° F., is in the form of particles of about 10-20 mesh. Contact is effected at a temperature of about 150° F. and a pressure of about 300 p. s. i. The product from the reaction zone is condensed, yielding about 635 grams of liquid product per standard cubic meter of combined ethylene, carbon monoxide and hydrogen in the feed. The liquid contains about 78 per cent diethyl ketone and 3 per cent propionaldehyde.

The residual gases are continuously recycled to the first reaction zone in admixture with the fresh feed.

As indicated above, the carbonylation catalyst shown may be identical with that used in the hydrocarbon synthesis reactor in which case the temperature and pressure of the carbonylation zone are advantageously varied somewhat within the ranges disclosed until the best conditions of operation are realized.

By altering the composition of the feed to the carbonylation zone so that either the molar ratio of ethylene to carbon monoxide is below about 1.5:1, or the molar ratio of ethylene to hydrogen is below 0.67:1, or by a combination of the two, the products may be channeled into production of predominantly propionaldehyde. As above disclosed, the selective production of corresponding ketones or aldehydes from any other predetermined olefin fraction may be similarly realized.

Obviously, many modifications and variations of the invention as hereinabove set forth may be made without departing from the spirit and scope thereof, and therefore only such limitations should be imposed as are indicated in the appended claims.

We claim:

1. In the preparation of carbonylated hydrocarbons wherein a synthesis gas containing essentially hydrogen and carbon monoxide is passed in contact with a hydrocarbon synthesis catalyst in a synthesis zone under reaction conditions including an elevated temperature at which the reactants are catalytically converted into desired hydrocarbon fractions including substantial proportions of desired olefins, the effluent product stream is withdrawn from contact with the synthesis catalyst, the mixed, normally gaseous fraction containing a substantial proportion of gaseous olefins is separated and the proportion of hydrogen and carbon monoxide therein regulated with respect to the olefin content and wherein the entire mixture thus formed is thereafter passed in contact with a carbonylation catalyst containing a metal of the iron group in a carbonylation zone at a pressure in the range of about 250-1000 p. s. i. and a temperature in the range of about 100-350° F. at which direct carbonylation of said olefin proceeds, the improvement which comprises effecting said adjustment of the proportion of hydrogen to carbon monoxide with respect to the olefin contained in the feed stream to the carbonylation zone by steps including subjecting said normally gaseous fraction to water-gas shift reaction conditions at an elevated temperature such that predetermined proportions of contained hydrogen and carbon dioxide formed in the synthesis zone are converted into carbon monoxide and water vapor, and effecting separation of water vapor prior to introduction of said gaseous stream into said carbonylation zone.

2. In the preparation of carbonylated hydrocarbons wherein a synthesis gas containing essentially hydrogen and carbon monoxide is passed in contact with a hydrocarbon synthesis catalyst in a synthesis zone under reaction conditions including an elevated temperature at which the reactants are catalytically converted into desired hydrocarbon fractions including substantial proportions of desired olefins, the effluent product stream is withdrawn from contact with the synthesis catalyst, the mixed, normally gaseous fraction containing a substantial proportion of gaseous olefins is separated and the proportion of hydrogen and carbon monoxide therein regulated with respect to the olefin content, and wherein the entire mixture thus formed is thereafter passed in contact with an iron-type carbonylation catalyst in a carbonylation zone at a pressure in the range of about 250-1000 p. s. i. and a temperature in the range of about 100-350° F. at which direct carbonylation of said olefin proceeds, the improvement wherein the same catalyst is employed in the synthesis zone as a hydrocarbon synthesis catalyst and in the carbonylation zone as a carbonylation catalyst, and continuously circulating said catalyst alternately between said synthesis and said carbonylation zones such that the catalyst remains for a substantial period of time in each zone, and thereafter is withdrawn and transferred to the other zone, thereby improving the life and activity of the catalyst for synthesis of hydrocarbons and carbonylation of olefins.

3. The improvement according to claim 2 wherein said catalyst comprises iron.

4. An improvement according to claim 2 wherein said catalyst comprises cobalt.

ALFRED J. MILLENDORF.
ERNEST A. NARAGON.
JOSEPH H. VERGILIO.

(References on following page)

REFERENCES CITED

The following references are of record in the file of this patent:

UNITED STATES PATENTS

| Number | Name | Date |
|---|---|---|
| 2,264,427 | Asbury | Dec. 2, 1941 |
| 2,403,524 | Hagemann | July 9, 1946 |
| 2,414,276 | Sensel et al. | Jan. 14, 1947 |
| 2,415,102 | Landgraf et al. | Feb. 4, 1947 |
| 2,436,957 | Eastman | Mar. 2, 1948 |
| 2,437,600 | Gresham et al. | Mar. 9, 1948 |
| 2,464,916 | Adams et al. | Mar. 22, 1949 |
| 2,473,995 | Gresham et al. | June 21, 1949 |

OTHER REFERENCES

National Petroleum News, Nov. 7, 1945, vol. 37, No. 45, section 2 (article on O. X. O. Process), pages R-926, R-928 and R-930.

U. S. Naval Technical Mission in Europe. Technical Report No. 248-45, "The Synthesis of Hydrocarbons and Chemicals from CO and $H_2$," pages 119 and 120; September, 1945.

Fiat Final Report No. 1000, PB-81,383, Dec. 26, 1947, page 38.